United States Patent
Fan et al.

(10) Patent No.: US 11,604,602 B2
(45) Date of Patent: Mar. 14, 2023

(54) CONTROL DEVICE, EXECUTION DEVICE AND DEVICE MANAGEMENT METHOD

(71) Applicant: HUAWEI TECHNOLOGIES CO., LTD., Shenzhen (CN)

(72) Inventors: Duoliang Fan, Nanjing (CN); Haoran Lei, Nanjing (CN); Yinliang Hu, Nanjing (CN); Li Shen, Nanjing (CN); Kun Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 74 days.

(21) Appl. No.: 17/208,205

(22) Filed: Mar. 22, 2021

(65) Prior Publication Data

US 2021/0303197 A1    Sep. 30, 2021

(30) Foreign Application Priority Data

Mar. 26, 2020 (CN) .......................... 202010224807.9

(51) Int. Cl.
*G06F 3/06* (2006.01)
*H04L 41/00* (2022.01)
*H04L 67/12* (2022.01)

(52) U.S. Cl.
CPC .......... *G06F 3/0655* (2013.01); *G06F 3/0604* (2013.01); *G06F 3/0679* (2013.01); *H04L 41/20* (2013.01); *H04L 67/12* (2013.01)

(58) Field of Classification Search
None
See application file for complete search history.

(56) References Cited

U.S. PATENT DOCUMENTS 6,209,023 B1 * 3/2001 Dimitroff ................ G06F 3/067
                                                        719/326
7,913,128 B2 * 3/2011 Pyeon ..................... G11C 29/02
                                                        714/715

(Continued)

FOREIGN PATENT DOCUMENTS

CN    102023346 A    4/2011
CN    102299811 A    12/2011

(Continued)

OTHER PUBLICATIONS

Zhou et al. "The Design and Realization of a Monitoring Platform for SFP Optical Transceiver Module." Information, Computing and Telecommunication. Sep. 20, 2009. 3 pages.

*Primary Examiner* — Elias Mamo
(74) *Attorney, Agent, or Firm* — Maier & Maier, PLLC (57) ABSTRACT

A control device, an execution device, a device management method, and a device management system are provided, and are related to the field of network technologies. The control device includes: a network communications interface configured to connect to an execution device through a network, where the execution device is a network communications device; and a processor configured to send a device management protocol packet through the network communications interface, where the device management protocol packet indicates an operation performed on a register in a first chip in the execution device and/or the device management protocol packet indicates that a pin of a second chip in the execution device is set to a status indicated by the device management protocol packet.

14 Claims, 10 Drawing Sheets

(56) References Cited

U.S. PATENT DOCUMENTS

| | | | | |
|---|---|---|---|---|
| 2006/0069884 A1* | 3/2006 | Kim | ...................... | H04L 12/283 |
| | | | | 711/154 |
| 2012/0182900 A1* | 7/2012 | Davari | .................. | H04L 43/062 |
| | | | | 370/254 |
| 2014/0136648 A1* | 5/2014 | Hemmi | ................. | G06F 3/0659 |
| | | | | 709/216 |
| 2018/0357076 A1* | 12/2018 | Wietfeldt | .............. | G06F 13/102 |

FOREIGN PATENT DOCUMENTS

| | | |
|---|---|---|
| CN | 103793345 A | 5/2014 |
| CN | 103905256 A | 7/2014 |
| CN | 104022934 A | 9/2014 |
| CN | 106469125 A | 3/2017 |
| CN | 106685826 A | 5/2017 |
| CN | 107070548 A | 8/2017 |
| CN | 107391409 A | 11/2017 |
| CN | 107820693 A | 3/2018 |
| CN | 106059660 B | 1/2019 |
| CN | 109147306 A | 1/2019 |
| CN | 110324165 A | 10/2019 |
| WO | 2016082456 A1 | 6/2016 |

\* cited by examiner

| MAC_DA (6B) | MAC_SA (6B) | Type/length 0xA001(2B) | OPCODE 0x36(1B) | SEQ_NUM (3B) | PORT_ID (2B) | MOD_ABS (1B) | FCS (4B) |

FIG. 7

| MAC_DA (6B) | MAC_SA (6B) | Type/length 0xA001(2B) | OPCODE 0x31(1B) | SEQ_NUM (3B) | PORT_ID (2B) | S_ADDR (1B) | W/R (1B) | LEN (2B) | FCS (4B) |

FIG. 8

| MAC_DA (6B) | MAC_SA (6B) | Type/length 0xA001(2B) | OPCODE 0x32(1B) | ACK_SEQ_NUM (3B) | DATA | FCS (4B) |

FIG. 9

| MAC_DA (6B) | MAC_SA (6B) | Type/length 0xA001(2B) | OPCODE 0x33(1B) | SEQ_NUM (3B) | PORT_ID (2B) | TX_Disable (1B) | FCS (4B) |

CONTROL DEVICE, EXECUTION DEVICE AND DEVICE MANAGEMENT METHOD

CROSS-REFERENCE TO RELATED APPLICATION

This application claims priority to Chinese Patent Application No. 202010224807.9, filed on Mar. 26, 2020, which is hereby incorporated by reference in its entirety.

TECHNICAL FIELD

The embodiments relate to the field of network technologies, and in particular, to a control device, an execution device, a device management method, and a device management system.

BACKGROUND

A campus network is usually a network such as a school campus network or an enterprise office network, and the campus network mainly includes a wireless access point (AP) and a switch. Switches are further classified into an access switch, an aggregation switch, and a core switch based on different locations and functions. With the advent of cloud computing technologies, a traffic structure model of the campus network has changed significantly. When building a campus network, an organization such as an enterprise, a school, or a government builds a centralized data center, or migrates applications to a cloud, resulting in data centralization, that is, a main data flow of cloud to terminal north-south interaction.

A conventional campus network is based on a distributed design, that is, each network device independently controls a network protocol, forwarding behavior, and device management. During service policy deployment, collaborative configuration needs to be performed across a plurality of network devices, so that a service and forwarding are tightly coupled. When the service changes, configurations of a large quantity of network devices need to be modified. In addition, updating a large quantity of network devices due to function requirements brings great difficulties to operation and maintenance. Moreover, corresponding to complex operation and maintenance, the network device needs to support various functions, causing a complex device design and high hardware costs.

To adapt to a north-south trend of cloudification traffic and reduce device costs and network operation and maintenance costs, the industry proposes a vertical virtualization solution. The main principle is that an aggregation switch is defined as a parent switch, and an access switch is defined as a client switch. The client switch does not need to support a network protocol and has no local forwarding capability. Therefore, costs of the client switch are reduced. In addition, the client switch sends traffic to the parent switch for processing, and is virtualized into a card of the parent switch for use, and an entire network is virtualized into a network element for management, thereby simplifying the network and improving operation and maintenance efficiency. The vertical virtualization solution implements centralized control and processing of a network protocol and data forwarding on the parent switch. A device management function of the client switch is still processed locally on the client switch.

Currently, a mainstream device management mode is still that a central processing unit (CPU) of a device is responsible for a device management function related to the device. A device management module is usually designed to be compatible with all functions of an entire series of switches. Consequently, a large amount of code for device management is required, and can be processed only by a high-performance CPU, and device costs are high. In addition, when the device management module needs to be updated, devices on an entire network need to be upgraded one by one, causing relatively high maintenance costs.

SUMMARY

To simplify maintenance, the embodiments provide a control device, an execution device, a device management method, and a device management system.

According to a first aspect, the embodiments provide a control device, including a network communications interface, configured to connect to an execution device through a network, where the execution device is a network communications device; and a processor, configured to send a device management protocol packet through the network communications interface, where the device management protocol packet indicates an operation performed on a register in a first chip in the execution device and/or the device management protocol packet indicates that a pin of a second chip in the execution device is set to a status indicated by the device management protocol packet.

In the embodiments, in a process of performing device management on the execution device, the control device is responsible for controlling a part such as a bus or a chip of the execution device or a pin of the chip, and the execution device only needs to simply respond to processing and report information. Therefore, when device management performed on the execution device is updated, only a device management program of the control device needs to be upgraded, without updating a large quantity of execution devices one by one, thereby reducing maintenance costs.

In an implementation, the network communications interface is further configured to receive a report packet from the execution device. The report packet includes a value of the register in the first chip in the execution device and/or a status of the pin of the second chip in the execution device.

In an implementation, the device management protocol packet includes a first identifier, a register identifier, and an operation type. The first identifier is an identifier of the first chip, the operation type is used to indicate a type of the operation performed by the execution device on the register in the first chip, and the operation type includes a read operation or a write operation. If the operation type is a write operation, the device management protocol packet further includes to-be-written data.

In an implementation, the device management protocol packet further includes a second identifier and a chip control indication. The second identifier is an identifier of the second chip, and the chip control indication is used to indicate to enable or disable a chip identified by the second identifier in the execution device.

In an implementation, the processor is further configured to explain, determine, and calculate a bus and a chip of the execution device, and a pin of the chip.

According to a second aspect, the embodiments provide an execution device. The execution device is a network communications device, and includes a network communications interface, a processor, and at least one chip. The at least one chip includes a first chip and a second chip, and the first chip and the second chip are a same chip or different chips. The network communications interface is configured to connect to a control device through a network. The processor is configured to receive a device management protocol packet through the network communications interface. The device management protocol packet includes an indication of an operation performed on a register in the first chip and/or an indication of a status of a pin of the second chip. The at least one chip is configured to perform the operation performed on the register in the first chip and/or set the pin of the second chip to a status indicated by the device management protocol packet, based on the device management protocol packet.

In a process of performing device management on the execution device in the embodiments, the execution device only needs to simply respond to processing and report information, without performing a logical operation such as calculation or determining Therefore, hardware (for example, a hardware unit such as a CPU, a DDR SDRAM, or a FLASH) and a software program for performing a logical operation do not need to be deployed on the execution device, so as to simplify an internal structure of the execution device, and reduce costs and power consumption of the execution device.

In an implementation, the processor is further configured to generate a report packet based on a value of the register in the first chip and/or a status of the pin of the second chip, and send the report packet to the control device through the network communications interface.

In an implementation, the device management protocol packet includes an identifier of the first chip, a register identifier, and an operation type. An operation indicated by the operation type includes a read operation or a write operation. The at least one chip is configured to perform the operation indicated by the operation type on a register that is identified by the register identifier and that is in the first chip. If the operation type is a write operation, the device management protocol packet further includes to-be-written data, and the at least one chip is configured to write the to-be-written data into the register identified by the register identifier in the first chip.

In an implementation, the device management protocol packet further includes an identifier of the second chip and a chip control indication. The at least one chip is configured to perform an enabled or a disabled operation indicated by the chip control indication on the second chip.

According to a third aspect, the embodiments provide a method. The method is performed by a control device. The control device connects to an execution device through a network, and the execution device is a network communications device. The method includes: sending a device management protocol packet through the network. The device management protocol packet indicates an operation performed on a register in a first chip in the execution device and/or the device management protocol packet indicates that a pin of a second chip in the execution device is set to a status indicated by the device management protocol packet.

In an implementation, the method further includes: receiving a report packet from the execution device. The report packet includes a value of the register in the first chip in the execution device and/or a status of the pin of the second chip in the execution device.

In an implementation, the device management protocol packet includes a first identifier, a register identifier, and an operation type. The first identifier is an identifier of the first chip, the operation type is used to indicate a type of the operation performed by the execution device on the register in the first chip, and the operation type includes a read operation or a write operation. If the operation type is a write operation, the device management protocol packet further includes to-be-written data.

In an implementation, the device management protocol packet further includes a second identifier and a chip control indication. The second identifier is an identifier of the second chip, and the chip control indication is used to indicate to enable or disable a chip identified by the second identifier in the execution device.

In an implementation, the processor is further configured to explain, determine, and calculate a bus and a chip of the execution device, and a pin of the chip.

According to a fourth aspect, the embodiments provide a method. The method is performed by an execution device. The execution device is a network communications device, and includes a network communications interface, a processor, and at least one chip. The at least one chip includes a first chip and a second chip, and the first chip and the second chip are a same chip or different chips. The execution device connects to a control device through a network. The method includes: receiving a device management protocol packet through the network communications interface, where the device management protocol packet includes an indication of an operation performed on a register in the first chip and/or an indication of a status of a pin of the second chip; and performing the operation performed on the register in the first chip and/or setting the pin of the second chip to a status indicated by the device management protocol packet, based on the device management protocol packet.

In an implementation, the method further includes: generating a report packet based on a value of the register in the first chip and/or a status of the pin of the second chip, and sending the report packet to the control device through the network communications interface.

In an implementation, the device management protocol packet includes an identifier of the first chip, a register identifier, and an operation type. An operation indicated by the operation type includes a read operation or a write operation. The at least one chip is configured to perform the operation indicated by the operation type on a register that is identified by the register identifier and that is in the first chip. If the operation type is a write operation, the device management protocol packet further includes to-be-written data, and the at least one chip is configured to write the to-be-written data into the register identified by the register identifier in the first chip.

In an implementation, the device management protocol packet further includes an identifier of the second chip and a chip control indication. The at least one chip is configured to perform an enabled or a disabled operation indicated by the chip control indication on the second chip.

According to a fifth aspect, the embodiments provide a device management system. The system includes the control device in any possible implementation of the first aspect and the execution device in any possible implementation of the second aspect.

According to a sixth aspect, the embodiments provide a computer-readable storage medium. The computer-readable storage medium stores an instruction. When the instruction is run on an electronic device, the network device is enabled to perform the method in the third aspect and the method in the fourth aspect.

According to a seventh aspect, the embodiments provide a computer program product including an instruction. When the computer program product is run on an electronic device, the electronic device is enabled to perform the method in the third aspect and the method in the fourth aspect.

It may be understood that both the computer storage medium in the sixth aspect and the computer program product in the seventh aspect are configured to perform the corresponding methods provided above. Therefore, for beneficial effects that can be achieved, refer to the beneficial effects in the corresponding methods provided above. Details are not described herein again.

DETAILED DESCRIPTION OF EMBODIMENTS

In the embodiments, the following uses an enterprise office network as an example to describe the solutions.

Figure 1:
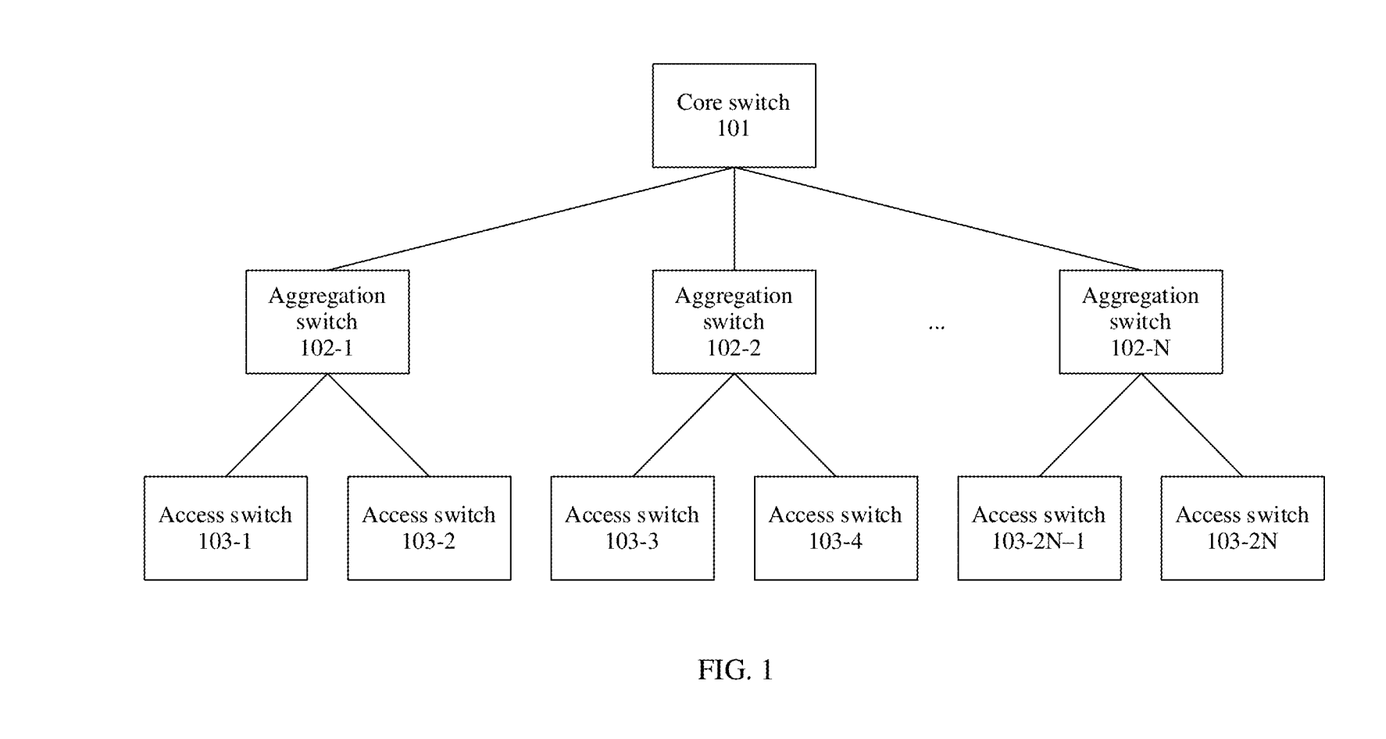
FIG. 1 is a schematic structural diagram of a network architecture of an enterprise office network.

FIG. 1 is a schematic structural diagram of a network architecture of an enterprise office network. As shown in FIG. 1, switches in an enterprise office network may be usually classified into a core switch 101, an aggregation switch 102, and an access switch 103. The core switch 101 is usually placed in an equipment room of an enterprise information center and is a convergence point of data traffic of a plurality of aggregation switches 102. The aggregation switch 102 is placed in a weak-current equipment room of a building and is also a convergence point of data traffic of a plurality of access switches 103. The access device 103 is placed in a weak-current well on each floor, and is configured to connect to an access point (AP) device or a wired terminal on the floor.

In this embodiment, if centralized device management is performed on network devices on an entire network, all switches may be classified into a control device and an execution device. The core switch 101 is used as a control device on the entire network, and the aggregation switch 102 and the access switch 103 are used as execution devices on the entire network.

Figure 2:
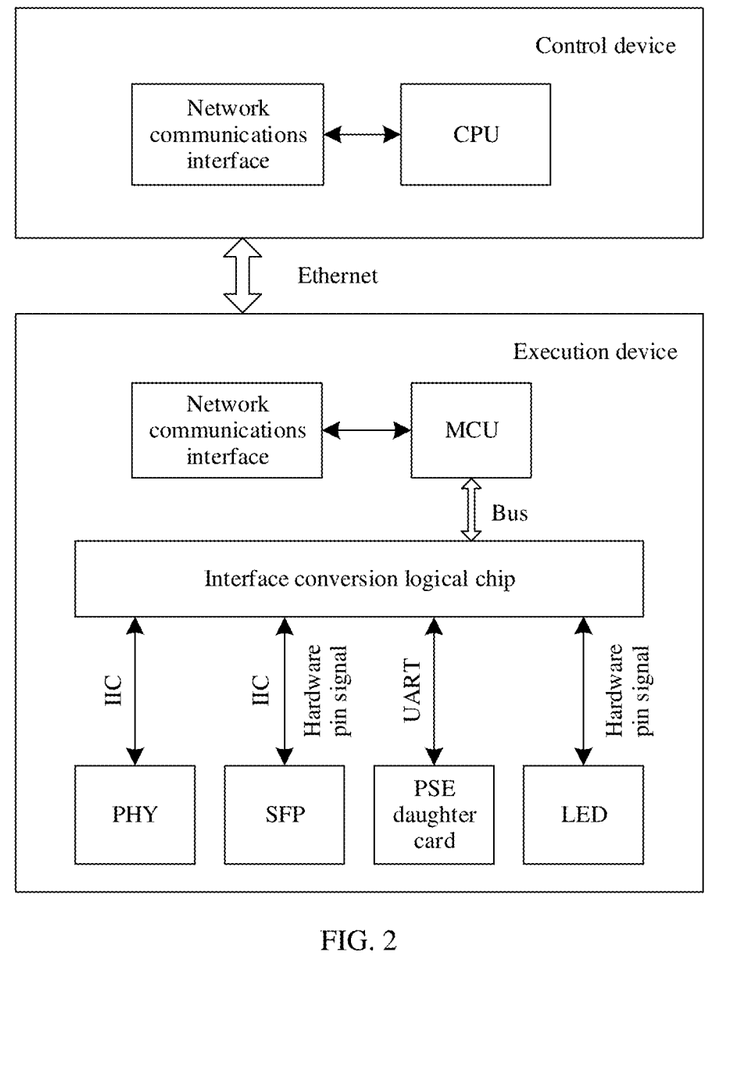
FIG. 2 is a schematic diagram of a structure between a control device and an execution device according to an embodiment.

For example, a device management system shown in FIG. 2 includes a control device and an execution device. The control device stores device information of at least one execution device, such as a device model, a device address, or an explanatory document of each piece of hardware in the device. In this case, the control device can control a part such as a bus or a chip of the execution device, or a pin of the chip based on the stored device information.

The control device includes a network communications interface and a processor. The processor has both a conventional function of explaining an instruction of the device and processing data in the device, and a function of controlling another device. In the embodiments, the processor in the control device generates a device management protocol packet based on a device management requirement for the execution device, and forwards the device management protocol packet to the execution device through the network communications interface. When receiving the device management protocol packet through the network communications interface, the execution device parses the device management protocol packet, identifies a corresponding execution device, device hardware, a packet type, and the like, and sends an identification result to a device management program for processing, so that the control device controls an operation on a part such as a bus or a chip of the execution device or a pin of the chip by using functions such as understanding, determining, and calculation.

In the embodiments, the processor in the control device may be a central processing unit (CPU). A memory may be further disposed in the processor and is configured to store an instruction and data. In some embodiments, the memory in the processor is a cache, and may store an instruction or data that is just used or cyclically used by the processor. If the processor needs to use the instruction or the data again, the processor may directly invoke the instruction or the data from the memory. This avoids repeated access and reduces a waiting time of the processor, thereby improving system efficiency.

The execution device is a network communications device, such as a switch, a router, or a firewall. The execution device includes parts such as a processor, a network communications interface, various buses, various chips, and pins of the chips. The bus may be an inter-integrated circuit (IIC) bus, a universal asynchronous receiver/transmitter (UART), or the like. The chip may be a physical layer (PHY) chip or a small form-factor pluggable (SFP) optical module, a power sourcing equipment (PSE) daughter card, a light emitting diode (LED), or the like. The pin of the chip is an interface for communication between the chip and another chip.

The processor in the execution device may be a CPU and is configured to complete operations such as instruction reading, instruction execution, and information exchange with an external memory and a logical part. In the embodiments, after receiving the device management protocol packet through the network communications interface, microcontroller unit (MCU) converts the device management protocol packet into a corresponding device hardware atomic operation, and then directly performs the operation on a part such as a bus or a chip or a pin of the chip at a bottom layer. When the part such as the bus or the chip or the pin of the chip changes, a change status of the part such as the bus or the chip or the pin of the chip is converted into a device management protocol packet, and the device management protocol packet is forwarded to the control device through the network communications interface. The device hardware atomic operation performed by the execution device may be a control operation or a bus operation. The control operation includes output control of a pin of a hardware device, input status monitoring of the pin of the hardware device, active reporting of an input status change of the pin of the hardware device, and the like. The bus operation includes an access device, an access address, an operation mode, a data length, data, and the like.

In the embodiments, because the processor in the execution device is only configured to complete the operations such as instruction reading, instruction execution, and information exchange with an external memory and a logical part, the processor may be a part such as the MCU instead of the CPU with a strong computing capability but high costs. Therefore, costs of the execution device can be reduced.

The network communications interface may be a part of a chip such as an application-specific integrated circuit (ASIC) or a network processor (NP).

In the embodiments, in a process of performing device management on the execution device, the control device is responsible for explaining, determining, and calculating the part such as the bus or the chip in the execution device or the pin of the chip, and the execution device only needs to simply respond to processing and report information, without performing logical operations, such as calculation and determining. Therefore, hardware (for example, a hardware unit such as a CPU, a DDR SDRAM, or a FLASH) and a software program for performing a logical operation do not need to be deployed on the execution device, so as to simplify an internal structure of the execution device and reduce costs and power consumption of the execution device. In addition, the control device is responsible for explaining, determining, and calculating the part such as the bus or the chip in the execution device or the pin of the chip. Therefore, when device management performed on the execution device is updated, only the device management program of the control device needs to be upgraded, without updating a large quantity of execution devices one by one, thereby reducing maintenance costs.

Any device may be used as the control device. For example, the control device may be a network communications device. Generally, a quantity of core switches 101 is smallest, but a capability of the core switch 101 is strongest in networking. Therefore, the core switch 101 is an optimal control device. Similarly, the embodiments also support centralized device management only for some network devices. For example, the aggregation switch 102 may be used as a control device of the some network devices, and the access switch 103 connected to the aggregation switch 102 is used as an execution device corresponding to the control device. This is not limited in the embodiments.

In addition, a device management method provided in the embodiments is not only applicable to a campus network, but also applicable to any network architecture such as a data center. The control device and the execution device are not limited to switches, and may alternatively be routers, AP devices, or the like.

In the embodiments, the following provides descriptions by using an example in which a control device controls an SFP optical module in an execution device.

Figure 3:
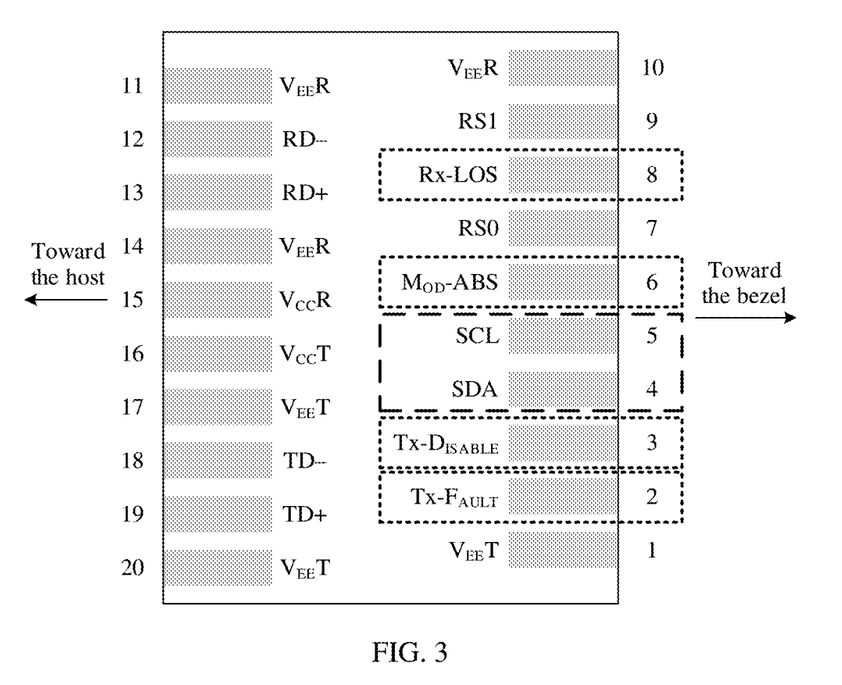
FIG. 3 is a schematic structural diagram of a pin of an SFP optical module.

FIG. 3 is a schematic structural diagram of a pin of an SFP optical module. As shown in FIG. 3, power pins (VEER and VCCT) of the pin of the SFP optical module are generally provided by a board and do not need to be controlled by a control device. Data pins (TD and RD) are configured to transmit data and are controlled by a protocol of a data layer. Therefore, the data pins do not need to be controlled by the control device. Remaining pins that need to be managed by a device include IIC bus pins (SCL and SDA) and control hardware pins (Rx_los/receive loss, Mod_abs/optical module absent, Tx-Disable/transmitter disable, and Tx-Fault/transmitter fault).

In this embodiment, a device management protocol packet sent by the control device and the execution device indicates a node that needs to be accessed, a device needs to be accessed, and an access manner, so that the device management protocol packet is accurately sent to a corresponding device or device. In addition, after the execution device converts the device management protocol packet into a hardware atomic operation, if the operation is a bus operation, information such as an access address, a read/write operation, a length, or data needs to be indicated. If the operation is a control operation, a level definition for hardware management needs to be specified.

Figure 4:
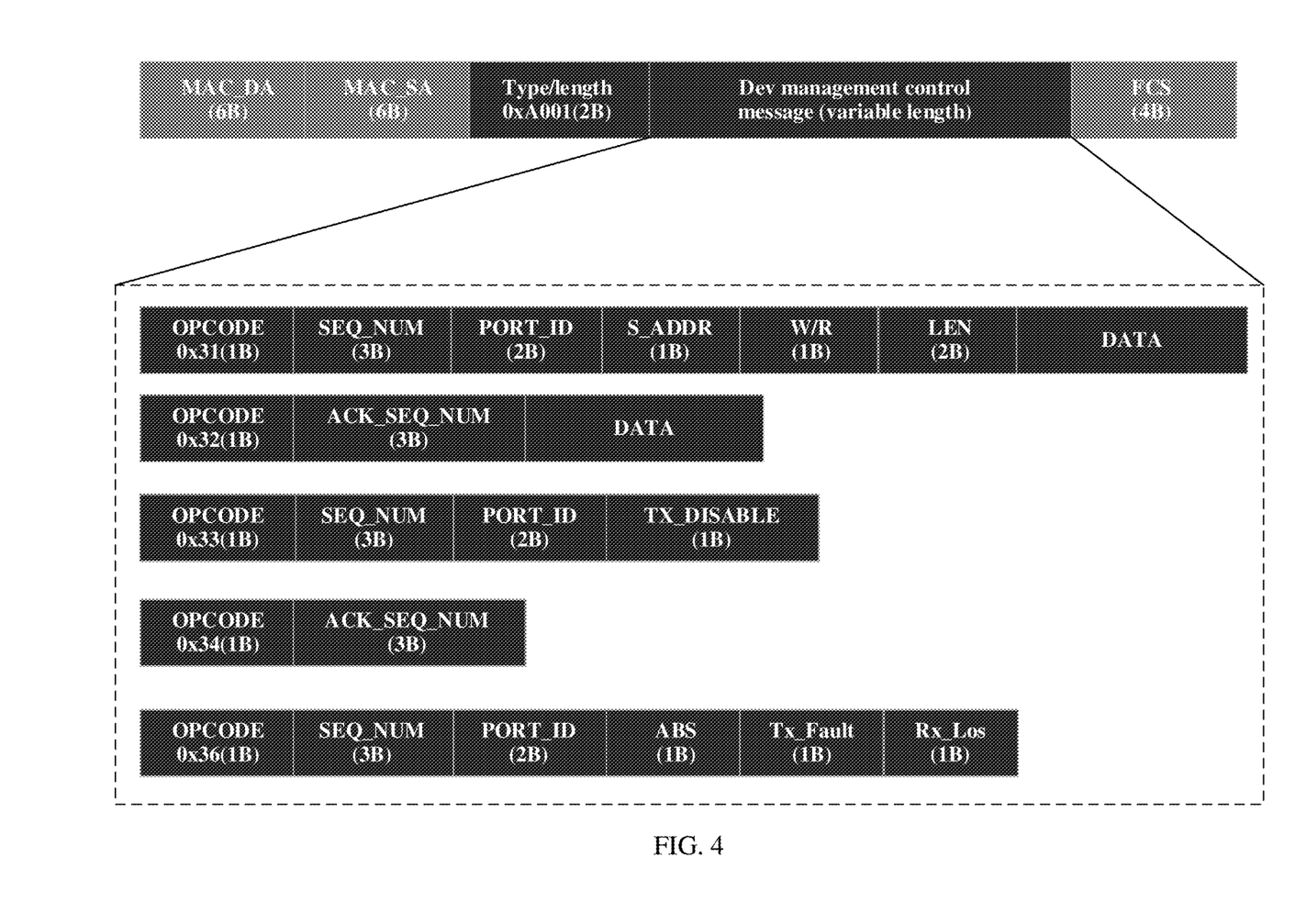
FIG. 4 is a schematic diagram of a definition of a device management control field for performing device management on an SFP optical module according to an embodiment.
Figure 5:
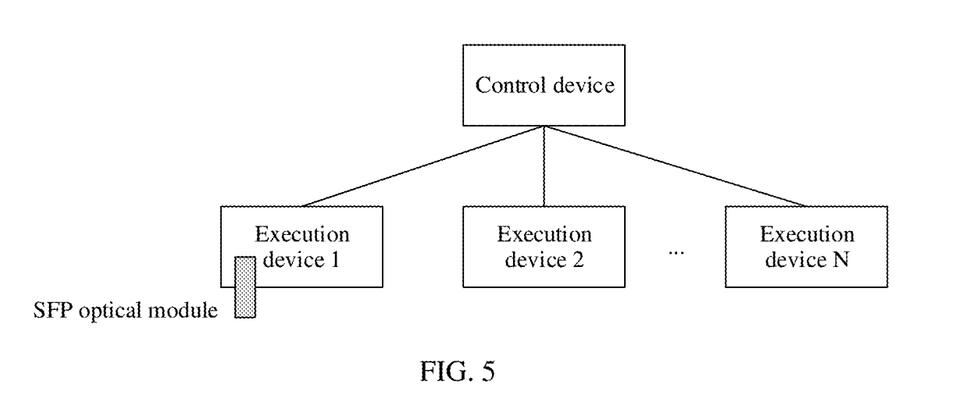
FIG. 5 is a schematic structural diagram of inserting an SFP optical module into an execution device according to an embodiment.

For example, as shown in FIG. 4, the device management protocol packet defined in this embodiment includes MAC_DA, MAC_SA, type/length, and a device management control field. MAC_DA represents a destination of the packet, and MAC_SA represents a source of the packet. In this embodiment, a MAC address of the execution device and a MAC address of the control device are separately filled in. If the device management protocol packet is sent by the control device to the execution device, MAC_DA is filled with the MAC address of the execution device, and MAC_SA is filled with the MAC address of the control device. If the device management protocol packet is sent by the execution device to the control device, MAC_DA is filled in with the MAC address of the control device, and MAC_SA is filled in with the MAC address of the execution device. Type/length indicates a type and a length of the packet, and type=0xA001 indicates that the packet is the device management control field.

In this embodiment, five types of device management control fields are defined as follows:

1. A bus read/write packet is a packet sent by the control device to the execution device, and is used to perform a data read/write operation on an IIC bus of the SFP optical module in the execution device.

For example, in the packet, OPCODE=0x31 is used to indicate that the packet is a bus access to the SFP optical module in the execution device. SEQ_NUM is used to indicate a sequence number of the read/write operation. PORT_ID is used to indicate an SFP optical module of a port. S_ADDR is used to indicate an IIC device address that needs to be accessed. W/R is used to indicate whether the operation is a write operation or a read operation. If the operation is a write operation, a DATA field needs to be followed to indicate data that needs to be written. If the operation is a read operation, the execution device needs to return read data. LEN is used to indicate a length of current accessed data.

2. A bus response packet is a packet sent by the execution device to the control device and is used to return a response to a bus read/write packet.

For example, in the packet, OPCODE=0x32 is used to indicate that the packet is a bus access response to the SFP optical module. ACK_SEQ_NUM is used to indicate to return, to the control device, a sequence number for performing a read/write operation on the execution device. If a write operation is performed on the execution device, the bus response packet needs to be followed by a DATA field, to indicate that data is read from the execution device.

3. A hardware pin control packet is a packet sent by the control device to the execution device and is used to control a hardware pin in the execution device.

For example, in the packet, OPCODE=0x33 is used to indicate that the packet is a control access to the SFP optical module in the execution device. SEQ_NUM is used to indicate a sequence number of a read/write operation.

PORT_ID is used to indicate an SFP optical module of a port. TX_DISABLE is used to indicate to control a TX_DISABLE pin. When TX_DISABLE is defined as a low level, a transmit port of the SFP optical module is enabled. When TX_DISABLE is defined as a high level, the transmit port of the SFP optical module is disabled. In this case, an energy saving function of the port of the SFP optical module is implemented.

4. A hardware pin response packet is a packet sent by the execution device to the control device and is used to return a hardware pin control result.

For example, in the packet, OPCODE=0x34 is used to indicate that the packet is a control access response to the SFP optical module. ACK_SEQ_NUM is used to indicate to return, to the control device, a sequence number for performing a TX_DISABLE pin control operation on the execution device. The sequence number of the control operation indicates that the execution device converts the hardware pin control packet into a corresponding device hardware atomic operation, and then detects a status of the TX_DISABLE pin. After the control device receives the sequence number of the control operation, if the detected TX_DISABLE pin complies with a level value defined in a packet previously sent by the control device, it indicates that the execution device performs the operation successfully. If the detected TX_DISABLE pin does not comply with the level value defined in the packet previously sent by the control device, it indicates that the execution device fails to perform the operation.

5. A hardware pin status packet is a packet sent by the execution device to the control device and is used to report status information of the hardware pin in the execution device.

For example, in the packet, OPCODE=0x36 is used to indicate that the packet is a status access of the SFP optical module. SEQ_NUM is used to indicate a sequence number of a read/write operation. PORT_ID is used to indicate an SFP optical module of a port. ABS is used to indicate a status of a MOD_ABS pin. TX_Fault is used to indicate a status of a TX_Fault pin. RX_Los is used to indicate a status of an RX_Los pin. A status of another pin may be further added to the packet.

Figure 6:
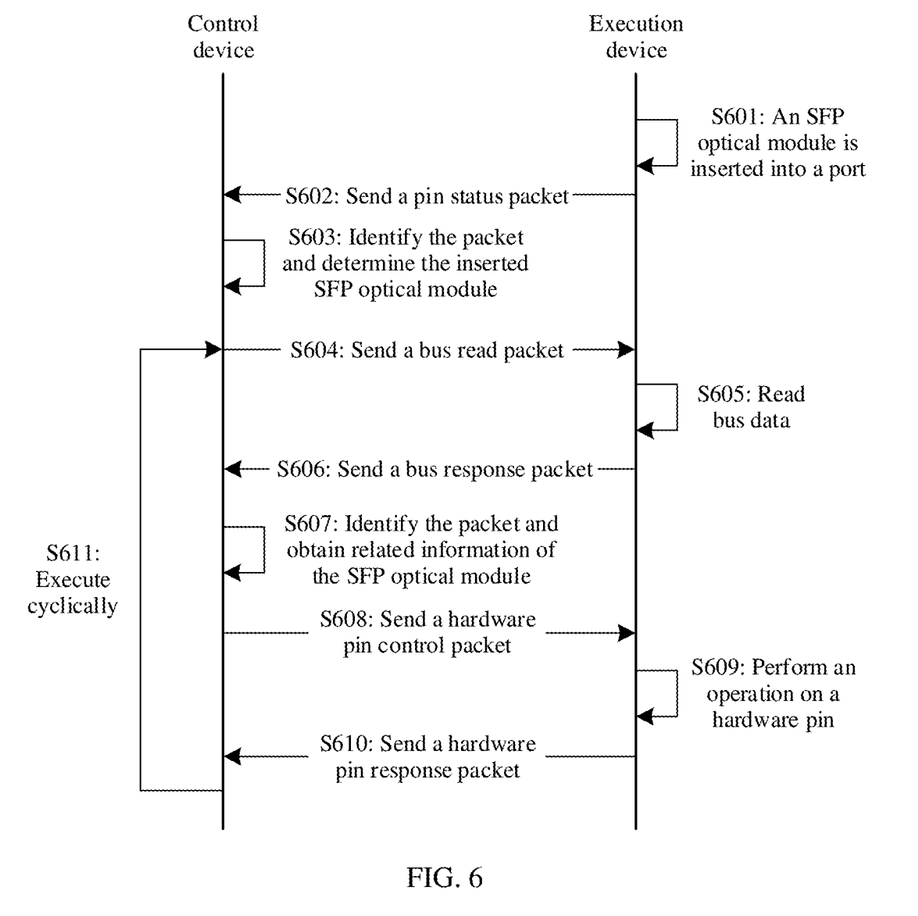
FIG. 6 is a flowchart of a working process between a control device and an execution device to save energy according to an embodiment.

As shown in FIG. 6, when an SFP optical module is inserted into an execution device in a plurality of execution devices controlled by a control device, a working process in which the control device controls the SFP optical module in the execution device to save energy is shown in FIG. 6.

Step S601: When the SFP optical module is inserted into a port of the execution device, the execution device finds that a level of a MOD_ABS pin changes and triggers a device management control field that generates a status of a hardware pin.

Step S602: The execution device generates a device management protocol packet with reference to the status of the hardware pin based on a MAC address of the execution device and a to-be-sent MAC address of the control device, and then sends the device management protocol packet to the control device.

Figure 7:
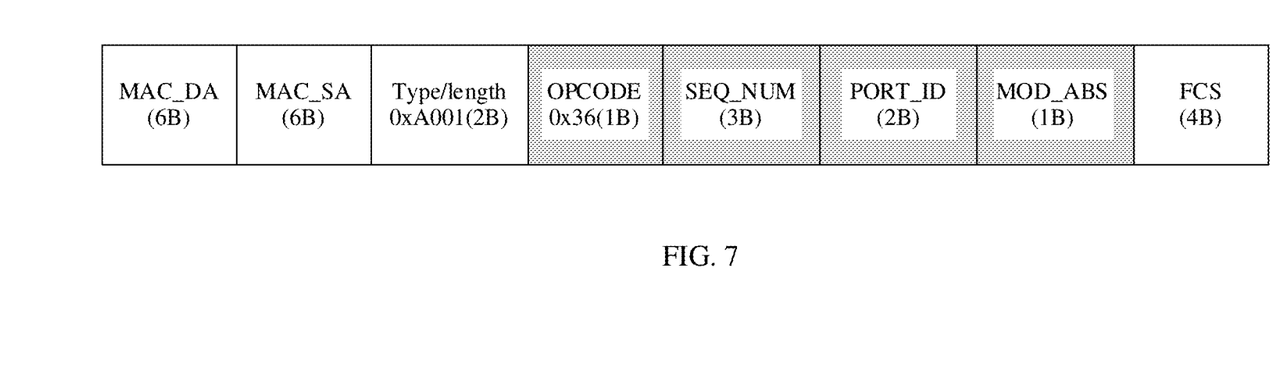
FIG. 7 is a schematic diagram of a definition of a device management protocol packet according to an embodiment.

A definition of the device management protocol packet generated by the execution device is shown in FIG. 7. MAC_DA is filled with a MAC address of the control device, and MAC_SA is filled with a to-be-sent MAC address of the execution device. Type defines that the packet is a device management control field. OPCODE=0x36 is used to indicate that the packet is a status access to the SFP optical module. SEQ_NUM is used to indicate a sequence number of a read/write operation. PORT_ID is used to indicate a port into which the SFP optical module is inserted in the execution device. MOD_ABS is used to indicate that a level status of a MOD_ABS pin changes from a high level to a low level.

Step S603: After receiving the device management protocol packet from the execution device, the control device parses the device management protocol packet. Because the control device has stored related information of the execution device, the control device identifies, based on "MAC_SA" obtained through parsing, an execution device that sends the device management protocol packet, identifies the packet as the device management control field based on "type/length", identifies, based on "OPCODE=0x36", that the status of the hardware pin of the SFP optical module changes, identifies, based on "PORT_ID", a port into which the SFP optical module is inserted in the execution device, and reads load data based on "MOD_ABS".

Because "MOD_ABS" is a control operation, whether the load data is at a high level or a low level is identified. If the load data is at a low level, it indicates that an SFP optical module is inserted into the port, and then an identification result is sent to a device management program for processing. If the load data is at a high level, the control device may perform no processing.

Step S604: The device management program of the control device generates a bus read packet based on the identification result, generates a device management protocol packet with reference to the MAC address of the control device and the to-be-sent MAC address of the execution device, and sends the device management protocol packet to the execution device to read data in an internal register of the SFP optical module, to learn of information about the SFP optical module.

Figure 8:
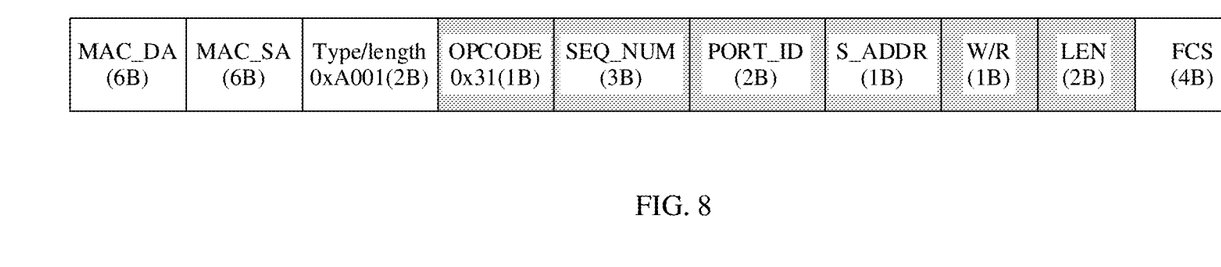
FIG. 8 is a schematic diagram of a definition of a device management protocol packet according to an embodiment.

A definition of the device management protocol packet generated by the control device is shown in FIG. 8. MAC_DA is filled with the to-be-sent MAC address of the execution device, and MAC_SA is filled with the MAC address of the control device. Type defines that the packet is a device management control field. OPCODE=0x31 is used to indicate that the packet is a bus access to the SFP optical module in the execution device. SEQ_NUM is used to indicate a sequence number of a read operation. PORT_ID is used to indicate a port into which the SFP optical module is inserted in the execution device. S_ADDR is used to indicate an address of the internal register of the SFP optical module that needs to be accessed. W/R is used to indicate the read operation. LEN is used to indicate a length of current accessed data.

Step S605: After receiving the device management protocol packet from the control device, the execution device parses the device management protocol packet. The execution device identifies, based on "OPCODE=0x31", that the SFP optical module is managed, identifies the sequence number of the read operation based on "SEQ_NUM", identifies, based on "PORT_ID", a port into which the SFP optical module is inserted in the execution device, identifies, based on "S_ADDR", the address of the internal register of the SFP optical module that needs to be accessed, identifies the read operation based on "W/R", and identifies the length of the current accessed data based on "LEN". Then, the execution device directly connects to SDA and SCL bus pins with the SFP optical module based on a bus time sequence and reads bus data. The execution device converts the read bus data into a bus response packet, generates a device management protocol packet with reference to the MAC address of the execution device and the to-be-sent MAC address of the control device, and sends the device management protocol packet to the control device.

Figure 9:
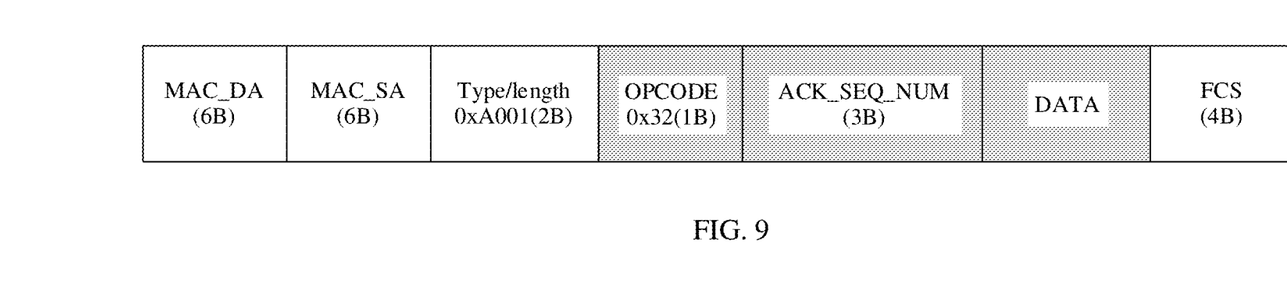
FIG. 9 is a schematic diagram of a definition of a device management protocol packet according to an embodiment.

A definition of the device management protocol packet generated by the execution device is shown in FIG. 9. MAC_DA is filled with the to-be-sent MAC address of the control device, and MAC_SA is filled with the MAC address of the execution device. Type defines that the packet is a device management control field. OPCODE=0x32 is used to indicate that the packet is a bus access response to the SFP optical module. ACK_SEQ_NUM is used to indicate a sequence number for returning a read operation response. DATA is used to indicate the read bus data.

Step S606: The execution device sends the device management protocol packet to the control device.

Step S607: After receiving the device management protocol packet, the control device parses the device management protocol packet. The control device identifies, based on "MAC_SA", an execution device that sends the device management protocol packet, identifies the packet as a device management control field based on "type/length", identifies, based on "OPCODE=0x32", that the SFP optical module is managed, identifies, based on "ACK_SEQ_NUM", a sequence number of a read operation response returned by the execution device, and identifies the bus data based on "DATA", to obtain related information of the SFP optical module, and send the related information to the device management program for processing.

Step S608: The control device calculates the related information of the SFP optical module, determines whether the SFP optical module needs to be in a working state currently, and determines, based on an energy saving management function requirement of the SFP optical module, whether to disable a sending function of the SFP optical module. Then, the control device generates a hardware pin control packet based on an analysis result, generates a device management protocol packet with reference to the MAC address of the control device and the to-be-sent MAC address of the execution device, and sends the device management protocol packet to the execution device.

Figure 10:
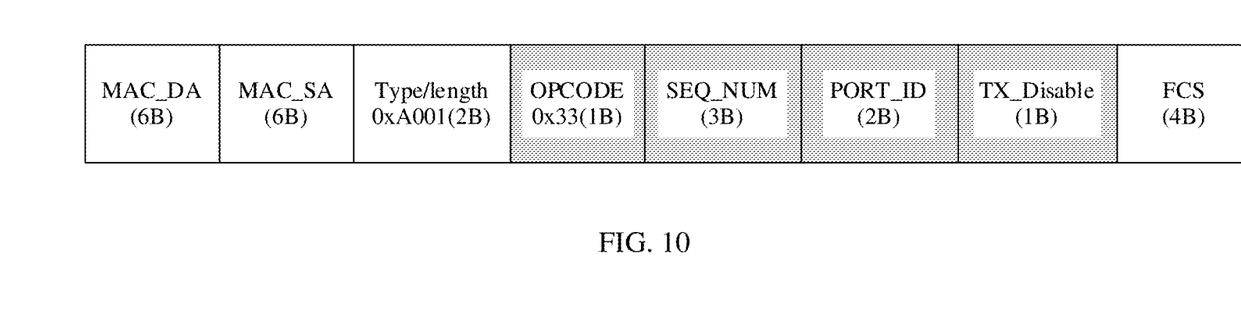
FIG. 10 is a schematic diagram of a definition of a device management protocol packet according to an embodiment.

A definition of the device management protocol packet generated by the control device is shown in FIG. 10. MAC_DA is filled with the to-be-sent MAC address of the execution device, and MAC_SA is filled with the MAC address of the control device. Type defines that the packet is a device management control field. OPCODE=0x33 is used to indicate that the packet is a control access to the SFP optical module in the execution device. SEQ_NUM is used to indicate a sequence number of an operation. PORT_ID is used to indicate a port into which the SFP optical module is inserted in the execution device. TX_DISABLE is used to indicate to control a TX_DISABLE pin.

Step S609: After receiving the device management protocol packet, the execution device parses the device management protocol packet. The execution device identifies, based on "OPCODE=0x33", that the SFP optical module is controlled and managed, identifies, based on "PORT_ID", a port into which the SFP optical module is inserted in the execution device, identifies, based on "TX_DISABLE", a level value for controlling the TX_DISABLE pin, and directly connects to the TX_DISABLE pin with the SFP optical module based on the level value. When an input value is "1", the execution device sets the level of the TX_DISABLE pin to a high level, to implement an energy saving function of a port of the SFP optical module. When an input value is "0", the execution device sets the level of the TX_DISABLE pin to a low level, to enable the SFP optical module to transmit data.

Step S610: The execution device controls and manages the TX_DISABLE pin based on the value of TX_DISABLE, generates a hardware pin response packet, generates a device management protocol packet with reference to the MAC address of the execution device and the to-be-sent MAC address of the control device, and sends the device management protocol packet to the control device.

Figure 11:
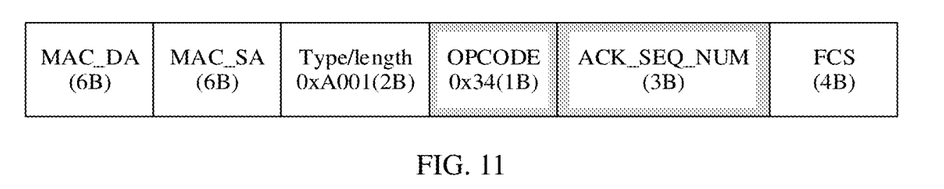
FIG. 11 is a schematic diagram of a definition of a device management protocol packet according to an embodiment.

A definition of the device management protocol packet generated by the execution device is shown in FIG. 11. MAC_DA is filled with the to-be-sent MAC address of the control device, and MAC_SA is filled with the MAC address of the execution device. Type defines that the packet is a device management control field. OPCODE=0x34 is used to indicate that the packet is a control access response to the SFP optical module. ACK_SEQ_NUM is used to indicate a sequence number of a response to a TX_DISABLE pin control result.

Step S611: After receiving the device management protocol packet from the execution device, the control device parses the device management protocol packet. The control device identifies the TX_DISABLE pin control result based on "ACK_SEQ_NUM", and then performs step S604 to step S610 cyclically to continuously detect the SFP optical module, to control and manage the execution device.

In the embodiments, after the SFP optical module is inserted into a port in the execution device, a level value of a MOD_ABS pin coupled to the SFP optical module changes. Then, the execution device converts a MOD_ABS status into a device management protocol packet and sends the device management protocol packet to the control device. After determining a specific control device and an SFP optical module of a specific port based on the received device management protocol packet, the control device sends a read operation instruction to the SFP optical module, to read related information of the SFP optical module. Then, the control device calculates, based on the related information of the SFP optical module, whether the SFP optical module receives or sends data. If the SFP optical module receives or sends data, the control device sends a low level value for controlling the TX_DISABLE pin to the SFP optical module, so that the corresponding TX_DISABLE pin in the execution device is set to a low level, and the SFP optical module transmits data. If the SFP optical module does not receive or send data, the control device sends a high level value for controlling the TX_DISABLE pin to the SFP optical module, so that the corresponding TX_DISABLE pin in the execution device is set to a high level, thereby implementing an energy saving function of the port of the SFP optical module.

A person of ordinary skill in the art may understand that, in combination with the examples described in the embodiments, units and algorithm steps may be implemented by electronic hardware or a combination of computer software and electronic hardware. Whether the functions are performed by hardware or software depends on particular applications and design constraints of the solutions. A person of ordinary skill in the art may use different methods to implement the described functions for each particular application, but it should not be considered that the implementation goes beyond the scope of the embodiments, which are non-limiting.

In addition, aspects or features in the embodiments may be implemented as a method, an apparatus, or a product that uses standard programming and/or engineering technologies. The term "product" used in the embodiments covers a computer program that can be accessed from any computer-readable component, carrier or medium. For example, a computer-readable medium may include, but is not limited to, a magnetic storage component (for example, a hard disk, a floppy disk, or a magnetic tape), an optical disc (for example, a compact disc (CD), or a digital versatile disc (DVD)), a smart card and a flash memory component (for example, an erasable programmable read-only memory (EPROM), a card, a stick, or a key drive). In addition, various storage media described in the embodiments may indicate one or more devices and/or other machine-readable media that are configured to store information. The term "machine-readable media" may include, but is not limited to, a radio channel, and various other media that can store, contain, and/or carry an instruction and/or data.

All or some of the foregoing embodiments may be implemented by using software, hardware, firmware, or any combination thereof. When the software is used to implement the embodiments, the embodiments may be implemented completely or partially in a form of a computer program product. The computer program product includes one or more computer instructions. When the computer program instructions are loaded and executed on a computer, the procedure or functions according to the embodiments are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be understood that sequence numbers of the foregoing processes do not mean execution sequences in various embodiments. The execution sequences of the processes should be determined based on functions and internal logic of the processes and should not be construed as any limitation on the implementation processes of the embodiments.

It may be understood by a person of ordinary skill in the art that, for the purpose of convenient and brief description, for a detailed working process of the foregoing system, apparatus, and unit, refer to a corresponding process in the foregoing method embodiments, and details are not described herein again.

In the several embodiments provided in the embodiments, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

When the functions are implemented in a form of a software functional unit and sold or used as an independent product, the functions may be stored in a computer-readable storage medium. Based on such an understanding, the solutions of the embodiments essentially, or the part contributing to the prior art, or some of the technical solutions may be implemented in a form of a software product. The computer software product is stored in a storage medium and includes several instructions for instructing a computer device (which may be a personal computer, a server, or an access network device, or the like) to perform all or some of the steps of the methods described in the embodiments. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of embodiments, but are not intended to limit the protection scope. Any variation or replacement readily figured out by a person of ordinary skill in the art within the scope disclosed shall fall within the protection scope.

What is claimed is:

1. A control device, comprising:
a network communications interface configured to connect to an execution device through a network, wherein the execution device is a network communications device; and
a processor configured to send a device management protocol packet through the network communications interface, wherein the device management protocol packet indicates an operation performed on a register in a first chip in the execution device and the device management protocol packet indicates that a pin of a second chip in the execution device is set to a status indicated by the device management protocol packet, wherein the network communications interface is further configured to receive a report packet from the execution device, and the report packet comprises a value of the register in the first chip in the execution device and a status of the pin of the second chip in the execution device.

2. The control device according to claim 1, wherein the device management protocol packet comprises a first identifier, a register identifier, and an operation type, the first identifier is an identifier of the first chip, the operation type is used to indicate a type of the operation performed by the execution device on the register in the first chip, and the operation type comprises a read operation or a write operation, wherein
if the operation type is a write operation, the device management protocol packet further comprises to-be-written data.

3. The control device according to claim 1, wherein the device management protocol packet further comprises a second identifier and a chip control indication, the second identifier is an identifier of the second chip, and the chip control indication is used to indicate to enable or disable a chip identified by the second identifier in the execution device.

4. The control device according to claim 1, wherein the processor is further configured to explain, determine, and calculate a bus and a chip of the execution device, and a pin of the chip.

5. An execution device, wherein the execution device is a network communications device, and comprises a network communications interface, a processor, and at least one chip, wherein the at least one chip comprises a first chip and a second chip, and the first chip and the second chip are a same chip or different chips;

the network communications interface is configured to connect to a control device through a network;

the processor is configured to receive a device management protocol packet through the network communications interface, wherein the device management protocol packet comprises an indication of an operation performed on a register in the first chip and an indication of a status of a pin of the second chip; and the at least one chip is configured to perform the operation performed on the register in the first chip and set the pin of the second chip to a status indicated by the device management protocol packet, based on the device management protocol packet wherein the processor is further configured to generate a report packet based on a value of the register in the first chip and a status of the pin of the second chip, and send the report packet to the control device through the network communications interface.

6. The execution device according to claim 5, wherein the device management protocol packet comprises an identifier of the first chip, a register identifier, and an operation type, an operation indicated by the operation type comprises a read operation or a write operation, and the at least one chip is configured to perform the operation indicated by the operation type on a register identified by the register identifier in the first chip, wherein if the operation type is a write operation, the device management protocol packet further comprises to-be-written data, and the at least one chip is configured to write the to-be-written data into the register identified by the register identifier in the first chip.

7. The execution device according to claim 5, wherein the device management protocol packet further comprises an identifier of the second chip and a chip control indication, and the at least one chip is configured to perform an enabled or a disabled operation indicated by the chip control indication on the second chip.

8. A device management method performed by a control device, the control device is a network communications device, the control device connects to an execution device through a network, and the method comprises:

sending a device management protocol packet through the network, wherein the device management protocol packet indicates an operation performed on a register in a first chip in the execution device and the device management protocol packet indicates that a pin of a second chip in the execution device is set to a status indicated by the device management protocol packet; and receiving a report packet from the execution device, wherein the report packet comprises a value of the register in the first chip in the execution device and a status of the pin of the second chip in the execution device.

9. The method according to claim 8, wherein the device management protocol packet comprises a first identifier, a register identifier, and an operation type, the first identifier is an identifier of the first chip, the operation type is used to indicate a type of the operation performed by the execution device on the register in the first chip, and the operation type comprises a read operation or a write operation, wherein if the operation type is a write operation, the device management protocol packet further comprises to-be-written data.

10. The method according to claim 8, wherein the device management protocol packet further comprises a second identifier and a chip control indication, the second identifier is an identifier of the second chip, and the chip control indication is used to indicate to enable or disable a chip identified by the second identifier in the execution device.

11. The method according to claim 8, further comprising: explaining, determining, and calculating a bus and a chip of the execution device, and a pin of the chip.

12. A device management method performed by an execution device, the execution device is a network communications device and comprises a network communications interface, a processor, and at least one chip, wherein the at least one chip comprises a first chip and a second chip, the first chip and the second chip are a same chip or different chips, the execution device connects to a control device through a network, and the method comprises:

receiving a device management protocol packet through the network communications interface, wherein the device management protocol packet comprises an indication of an operation performed on a register in the first chip and an indication of a status of a pin of the second chip;

performing the operation performed on the register in the first chip and setting the pin of the second chip to a status indicated by the device management protocol packet, based on the device management protocol packet; and generating a report packet based on a value of the register in the first chip and a status of the pin of the second chip, and sending the report packet to the control device through the network communications interface.

13. The method according to claim 12, wherein the device management protocol packet comprises an identifier of the first chip, a register identifier, and an operation type, an operation indicated by the operation type comprises a read operation or a write operation, and the at least one chip is configured to perform the operation indicated by the operation type on a register identified by the register identifier in the first chip, wherein if the operation type is a write operation, the device management protocol packet further comprises to-be-written data, and the at least one chip is configured to write the to-be-written data into the register identified by the register identifier in the first chip.

14. The method according to claim 12, wherein the device management protocol packet further comprises an identifier of the second chip and a chip control indication, and the at least one chip is configured to perform an enabled or a disabled operation indicated by the chip control indication on the second chip.

* * * * *